United States Patent
Kuo et al.

(10) Patent No.: US 12,526,294 B1
(45) Date of Patent: Jan. 13, 2026

(54) DETECTION OF SUSPICIOUS UNIFORM RESOURCE LOCATORS

(71) Applicant: Trend Micro Incorporated, Tokyo (JP)

(72) Inventors: Chih-Yu Kuo, Taipei (TW); Chia-Chin Ho, Taipei (TW); Mong-Ting Wu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 113 days.

(21) Appl. No.: 18/522,891

(22) Filed: Nov. 29, 2023

(51) Int. Cl.
G06F 16/955 (2019.01)
H03M 7/46 (2006.01)
H04L 9/40 (2022.01)

(52) U.S. Cl.
CPC .................. H04L 63/1416 (2013.01)

(58) Field of Classification Search
None
See application file for complete search history.

(56) References Cited

U.S. PATENT DOCUMENTS

| | | | | |
|---|---|---|---|---|
| 2010/0302078 | A1* | 12/2010 | Schuessler | G06K 7/1404 341/90 |
| 2018/0337947 | A1* | 11/2018 | Schiffman | H04L 65/10 |
| 2019/0387024 | A1* | 12/2019 | Schulman | H04L 63/0236 |
| 2020/0012693 | A1* | 1/2020 | Denninghoff | G06F 3/04842 |
| 2021/0097168 | A1* | 4/2021 | Patel | G06F 21/554 |
| 2022/0414055 | A1* | 12/2022 | Collier | G06F 16/116 |

OTHER PUBLICATIONS

Joseph Pyram, "9 Parts of a URL You Should Know", Medium, Oct. 6, 2020, https://medium.com/@joseph.pyram/9-parts-of-a-url-that-you-should-know-89fea8e11713.
"Base64", Wikipedia, Downloaded Oct. 4, 2023, https://en.wikipedia.org/wiki/Base64.
"Email Address", Wikipedia, Downloaded Oct. 20, 2023, https://en.wikipedia.org/Email_address.
Clifford Chi, "Parts of a URL: A Short Guide", May 10, 2023, https://blog.hubspot.com/marketing/parts-url#:~:text=What.
"Regular Expression", Wikipedia, Downloaded Oct. 20, 2023, https://en.wikipedia.org/Regular_expression.
"Regular Expressions (Regex)", Downloaded Nov. 8, 2023, https://www3.ntu.edu.sg/home/ehchua/programming/howto/Regexe.html.

* cited by examiner

*Primary Examiner* — Christopher B Robinson
(74) *Attorney, Agent, or Firm* — Beyer Law Group LLP

(57) ABSTRACT

A suspicious Uniform Resource Locator (URL) of a resource on the public Internet is detected by searching a part of the URL for a candidate substring, which is the longest possible substring that is in accordance with a Base64 encoding scheme. The candidate substring is converted to a candidate binary data in accordance with the Base64 encoding scheme. The candidate binary data is then converted to a candidate American Standard Code for Information Interchange (ASCII) string. The candidate ASCII string is evaluated to determine the information type of the candidate ASCII string. A determination as to whether the URL is suspicious is based at least on the information type of the candidate ASCII string.

20 Claims, 3 Drawing Sheets

DETECTION OF SUSPICIOUS UNIFORM RESOURCE LOCATORS

TECHNICAL FIELD

The present disclosure is directed to cybersecurity.

BACKGROUND

A Uniform Resource Locator (URL) is a continuous string of characters that is used to identify a webpage or other resource on the public Internet. A URL typically includes the domain name of the web server that hosts the resource, the path to the resource, and any additional parameters or data needed to access or display the resource.

Base64 is a well-known binary to text encoding scheme. More particularly, the Base64 encoding scheme converts binary data to printable text characters. Use of the Base64 encoding scheme in URLs is quite common because of widespread support of the Base64 encoding scheme across programming languages and platforms. Unfortunately, attackers (i.e., cybercriminals, malicious actors, hackers) also use the Base64 encoding scheme to hide sensitive information in URLs, such as email addresses.

It is thus important for cybersecurity reasons to be able to decode Base64 encoded data in URLs. One approach for decoding Base64 encoded data in a URL is to parse the URL to extract the fragment part of the URL, and decode the fragment part in accordance with the Base64 encoding scheme. However, such approach is not comprehensive and fails in certain scenarios.

BRIEF SUMMARY

In one embodiment, a suspicious Uniform Resource Locator (URL) of a resource on the public Internet is detected by searching parts of the URL for a candidate substring, which is the longest possible substring that is in accordance with the Base64 encoding scheme. The candidate substring is converted to a candidate binary data in accordance with the Base64 encoding scheme. The candidate binary data is then converted to a candidate American Standard Code for Information Interchange (ASCII) string. The candidate ASCII string is evaluated to determine the information type of the candidate ASCII string. A determination as to whether the URL is suspicious is based at least on the information type of the candidate ASCII string.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
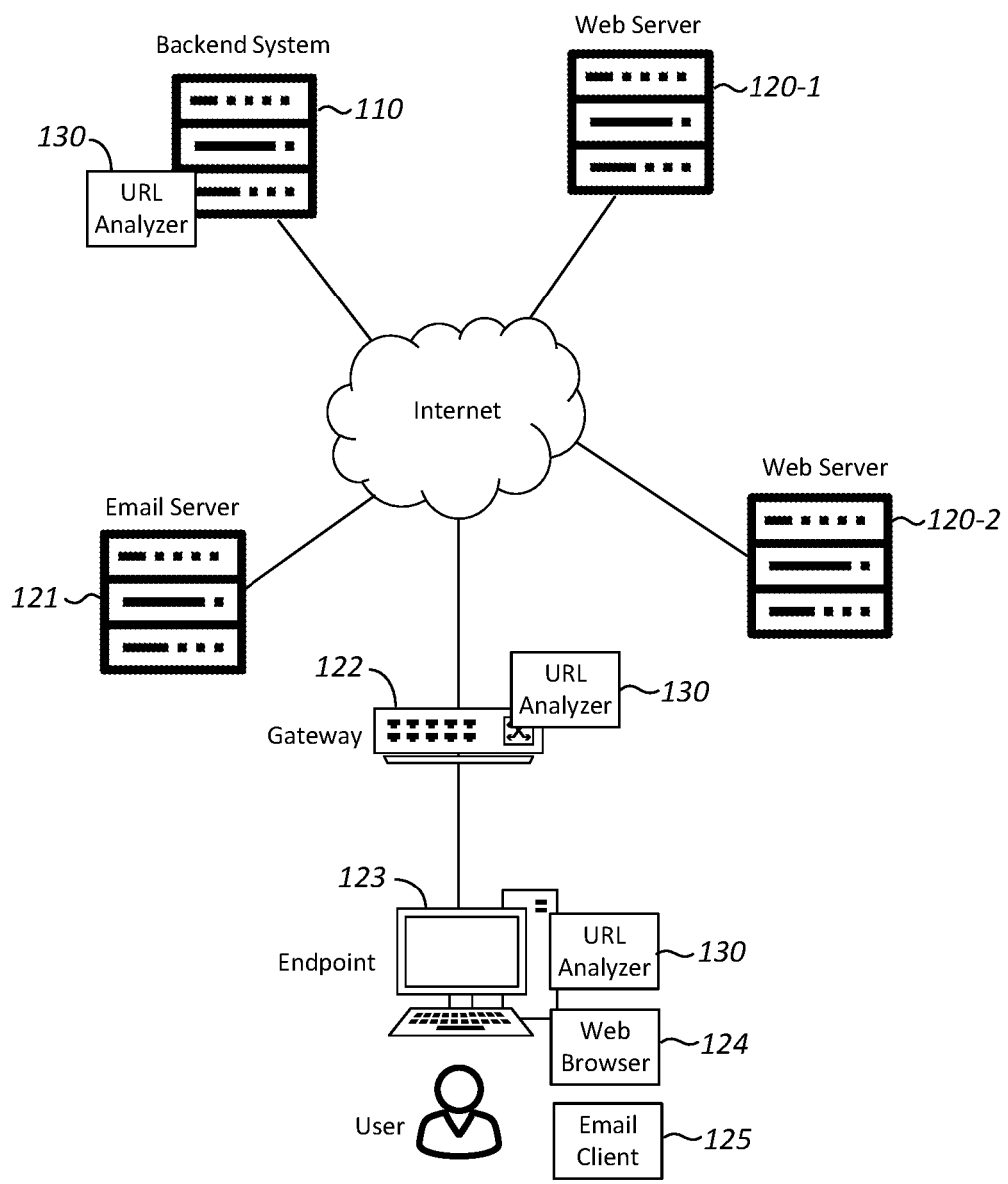
FIG. 1 shows a block diagram of a computing environment, in accordance with an embodiment of the present invention.

FIG. 1 shows a block diagram of a computing environment, in accordance with an embodiment of the present invention. In the example of FIG. 1, a plurality of web servers 120 (i.e., 120-1, 120-2, etc.), one or more email servers 121, and a backend system 110 communicate over the public Internet. An endpoint computer 123 connects to and communicates over the public Internet by way of a gateway 122.

The endpoint computer 123 may comprise a laptop, desktop, or other computer system employed by a user. The endpoint computer 123 runs a web browser 124 (e.g., Google Chrome™ web browser) for accessing webpages hosted by the web servers 120, and runs an email client 125 (e.g., Microsoft Outlook™ email client) for accessing emails from the email server 121. Only one endpoint computer 123 is shown in FIG. 1 for clarity of illustration. As can be appreciated, embodiments of the present invention are applicable to multiple endpoint computers 123.

The endpoint computer 123 may receive a URL using a client software, such as the web browser 124 and the email client 125. For example, the user may click a link to a webpage hosted by the web server 120-1, which points the web browser 124 to the URL of the webpage. The URL of the webpage is displayed on the address bar of the web browser 124. As another example, a URL may be included in the body of an email received by the email client 125.

Generally, a URL can have a plurality parts, namely a scheme, subdomain, top-level domain, second level domain, subdirectory, parameter, port, path, query, and fragment. The subdomain, top-level domain, and second level domain are also collectively referred to as a hostname. It is to be noted that a URL does not necessarily have all of the aforementioned parts. For example, a URL does not necessarily have a fragment or a parameter.

URLs can contain a significant amount of information. For example, a URL for a search engine query may include not only the search terms, but also the language, location, and other settings specified by the user. Typically, each part of a URL has its own unique text format and intended usage. Any deviation from established norms of the text format and intended usage indicates a suspicious URL, i.e., a URL that attackers use to perpetrate a cyberattack (e.g., phishing, theft of sensitive information, etc.). As a particular example, the inventors have observed that an email address in a URL is not normal and is thus highly suspicious.

To identify suspicious URLs and potentially preempt a cyberattack, substrings of the URL, the information format of the substrings, and usage of the substrings in the URL may be analyzed to identify deviations from established norms. However, attackers can make the URL analysis difficult by hiding telltale information of a cyberattack. More particularly, the telltale information may be encoded in accordance with the Base64 encoding scheme to make the telltale information harder to identify.

The Base64 encoding scheme involves three fundamental steps to ensure accurate and effective conversion as follows. First, a string is converted into binary data using a character encoding scheme, such as UTF-8. Second, the binary data is divided into 6-bit chunks, with each 6-bit chunk being represented by a single character from the Base64 character set. Third, if the length of the encoded string is not a multiple of 4 characters, a pad character ("=") is padded to the last (i.e., rightmost) portion of the encoded string. This means that the length of the resulting encoded string will always be a multiple of 4 characters.

An example telltale information of a cyberattack is an email address, which an attacker can use to target or keep track of a potential victim in phishing attacks. More particularly, a phishing webpage may have a URL that includes an email address of a user that is specifically being targeted by the phishing attack. For example, the URL, "https://example.com/?e=victim@example.com&m=1", includes the email address "victim@example.com" as a parameter of the URL. To hide the email address in the URL, the email address may be encrypted in accordance with the Base64 encoding scheme, for example as follows:

"https://example.com/
?e=dmljdGltQGV4YW1wbGUuY29t&m=1",
"https://example.com/
?e=AdmljdGltQGV4YW1wbGUuY29t&m=1", and
"https://example.com/?p-
web&e=dmljdGltQGV4YW1wbGUuY29t", where "dmljdGltQGV4YW1wbGUuY29t" is "victim@example.com" encoded in accordance with the Base64 encoding scheme. Encoding telltale information of a cyberattack in Base64 allows the URL to evade cybersecurity modules that look for email addresses and other telltale information in URLs.

The inventors discovered that telltale information of the cyberattack may be encoded in Base64 and included in the path, query, parameters, and fragment of the URL. That is, looking for telltale information only in the fragment of the URL may allow some suspicious URLs to remain undetected. Furthermore, adding other information in front of the Base64 encoded string could lead to decoding failure.

In the example of FIG. 1, a URL analyzer 130 comprises program code (i.e., instructions executed by a processor) for detecting suspicious URLs. In one embodiment, the URL analyzer 130 receives a target (i.e., being analyzed) URL, searches parts of the target URL for the longest possible Base64 substrings, converts each longest possible Base64 substring into binary data in accordance with the Base64 encoding scheme, converts each of the binary data into a string of American Standard Code for Information Interchange (ASCII) characters, and determines an information type of each of the strings of ASCII characters. In one embodiment, information types that are indicative of suspicious URLs include email address, phone number, credit card number, etc. The URL analyzer 130 may include a plurality of detection rules for detecting different information types. An example detection rule is a regular expression. More particularly, a first regular expression may be used to detect an ASCII string that is an email address, a second regular expression may be used to detect an ASCII string that is a phone number, etc.

A URL analyzer 130 may be deployed to detect suspicious URLs in various computer systems at different network locations. For example, a URL analyzer 130 may be deployed in the endpoint computer 123. When an email is received by the email client 125, the email client 125 may scan the email for URLs and provide the URLs to the URL analyzer 130. Also, when the web browser 124 is pointed to a URL of a webpage, the web browser 124 may pass the URL to the URL analyzer 130; the URL analyzer 130 may also intercept URLs as they are received by or entered in the web browser 124.

As another example, a URL analyzer 130 may be deployed in the gateway 122, so that URLs in network traffic passing through the gateway 122 may be analyzed to detect suspicious URLs.

Yet another example, a URL analyzer 130 may be deployed in the backend system 110. The backend system 110 may be a dedicated server computer system, a cloud computing infrastructure (e.g., Amazon Web Services™ cloud service), or other computer system available over the public Internet. URLs received in the endpoint computer 123, the gateway 122, or other computing device may forward URLs to the backend system 110 to detect suspicious URLs.

Figure 2:
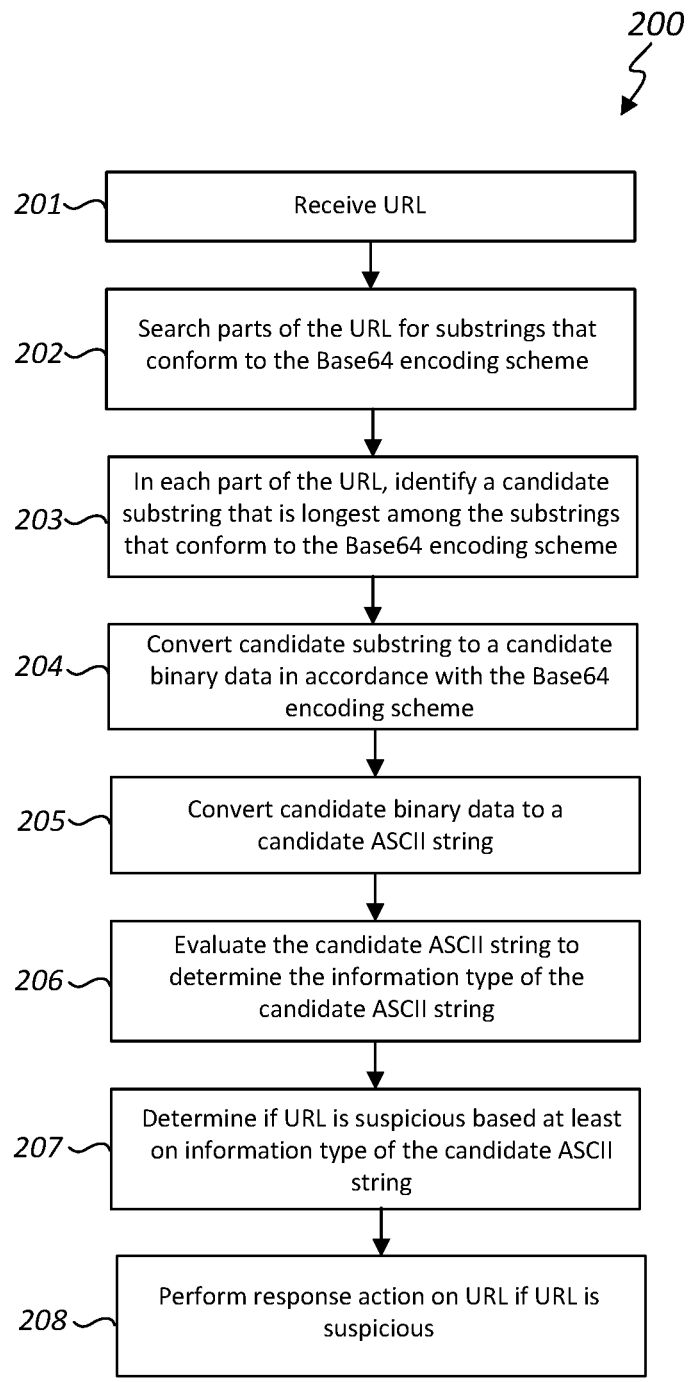
FIG. 2 shows a flow diagram of a method of detecting suspicious URLs, in accordance with an embodiment of the present invention.

FIG. 2 shows a flow diagram of a method 200 of detecting suspicious URLs, in accordance with an embodiment of the present invention. The method 200 may be performed by a URL analyzer 130 running on a computer system, such as the endpoint computer 123, the backend system 110, or the gateway 122. Such a computer system may include at least one processor and a memory, with the memory storing instructions that when executed by the at least one processor cause the computer system to perform the steps of the method 200.

In step 201, a target URL of a resource on the public Internet is received in the computer system. The resource may be a webpage hosted by a web server, for example.

When the computer system is an endpoint computer, the target URL may be received in the computer system from a web browser or an email client that is running on the endpoint computer. For example, the target URL may be received in the computer system by a web browser that is pointed to the target URL. As another example, the target URL may be in a content (e.g., body, attachment, etc.) of an email received by the email client.

When the computer system is a backend system, the target URL may be forwarded to the backend system by an endpoint computer that received the target URL from a web browser or an email client that is running on the endpoint computer. The backend system may be a cloud computing infrastructure.

When the computer system is a gateway, the target URL may be received from network traffic that passes through the gateway.

In step 202, each of a plurality of parts of the URL is searched for substrings that conform to the Base64 encoding scheme. In one embodiment the parts of the URL that are searched are the path, query, parameters, and fragment of the URL.

In one embodiment, a substring that conforms to the Base64 encoding scheme has to meet the following criteria: (a) has a character length that is a multiple of 4 characters; (b) has a last character that is located at the end (i.e., rightmost) of the part; and (c) only contains characters that are from the Base64 character set. The substrings of the URL part that conform to the Base64 encoding scheme may be found by testing the entirety and truncated versions (e.g., by removing a character at a time from the front) of a substring of the URL part against the criteria.

In step 203, the longest among the substrings of a part of the URL that conform to the Base64 encoding scheme is taken as a candidate substring. That is, the candidate substring is the longest possible substring in a part of the URL.

As can be appreciated, a URL does not necessarily have a part with a substring that meets the criteria for the Base64 substring. That is, step 203 may result in zero, one, or a plurality of candidate substrings. The following steps 204 to 208 are performed for each candidate substring. The substring is referred to as "candidate" in that it may or may not be a Base64 encoded telltale information of a cyberattack. The following steps test each candidate substring to determine if it is Base64 encoded and has an information type that is indicative of suspicious URLs.

In step 204, each candidate substring is converted to binary data, referred to herein as "candidate binary data", in accordance with the Base64 encoding scheme. More particularly, each character of the candidate substring is presumed to be a Base64 character from the Base64 character set, which is then decoded to a corresponding binary data in accordance with the Base64 encoding scheme.

In step 205, each candidate binary data is converted to an ASCII string, which is referred to herein as "candidate ASCII string." In other words, the candidate binary data is converted to a string of ASCII characters in accordance with the ASCII table.

In step 206, each candidate ASCII string is evaluated to determine the information type of the candidate ASCII string. In one embodiment, each information type has a corresponding regular expression that serves as a detection rule for detecting the information type. For example, the candidate ASCII string may be matched against a regular expression that matches a syntax of a valid email address to determine if the candidate ASCII string is an email address. As another example, the candidate ASCII string may be matched against another regular expression that matches known phone number formats to determine if the candidate ASCII string is a phone number.

In step 207, it is determined if the target URL is suspicious based at least on the information type of each candidate ASCII string. In one embodiment, the target URL is detected to be suspicious if any of its candidate ASCII strings represents an email address, a phone number, a credit card number, or other sensitive information of a user.

In step 208, a response action is performed in response to detecting that the target URL is suspicious. The response action may include raising an alert, such as by recording the detection of the suspicious URL in a security log, sending a text message to cybersecurity personnel, displaying a warning message on a display screen, sending a signal to another cybersecurity module, etc.

In an example operation of the method 200, assume a target URL of a webpage is:

"https://example.com/
?e=AdmljdGltQGV4YW1wbGUuY29t&m=1".

There are parameters the two in target URL, which are "e=AdmljdGltQGV4YW1wbGUuY29t" and "m=1". As is conventional, a question ("?") character precedes the parameters, and an ampersand ("&") character separates the substrings of the parameters. From the substrings, "e=AdmljdGltQGV4YW1wbGUuY29t" is considered. The "m=1" substring is dropped from consideration because it has a length of 3 characters, which is not a multiple of 4 characters and accordingly does not meet the criteria for a Base64 substring.

The following substrings from "e=AdmljdGltQGV4YW1wbGUuY29t" meet the criteria for a Base64 substring in that they only contain characters from the Base64 character set and has a last character that is at the end of the parameter of the target URL:

(a) dmljdGltQGV4YW1wbGUuY29t
(b) dGltQGV4YW1wbGUuY29t
(c) QGV4YW1wbGUuY29t
(d) YW1wbGUuY29t
(e) bGUuY29t
(f) Y29t From the immediately above substrings, "dmljdGltQGV4YW1wbGUuY29t" is taken as the candidate substring because it is the longest among them. The longest possible Base64 substring is taken as the candidate substring to retain the most information for the subsequent steps.

The candidate substring "dmljdGltQGV4YW1wbGUuY29t" is converted to binary data, which is then converted to the ASCII string "victim@example.com". A regular expression that matches the "local-part@domain" syntax of a valid email address may be used against the ASCII string to detect that the ASCII string is an email address.

For example, the candidate ASCII string "victim@example.com" may be matched against the following regular expression (Regex) to detect whether it represents an email address, i.e., has email address as information type:

'\w+@\w+\.\w+'

The immediately above regular expression matches an email address with (a) local-part: word character (\w, including alphanumeric and underscore) string; (b) domain: word character string; and (c) and a top-level-domain, which is also a word character string.

Figure 3:
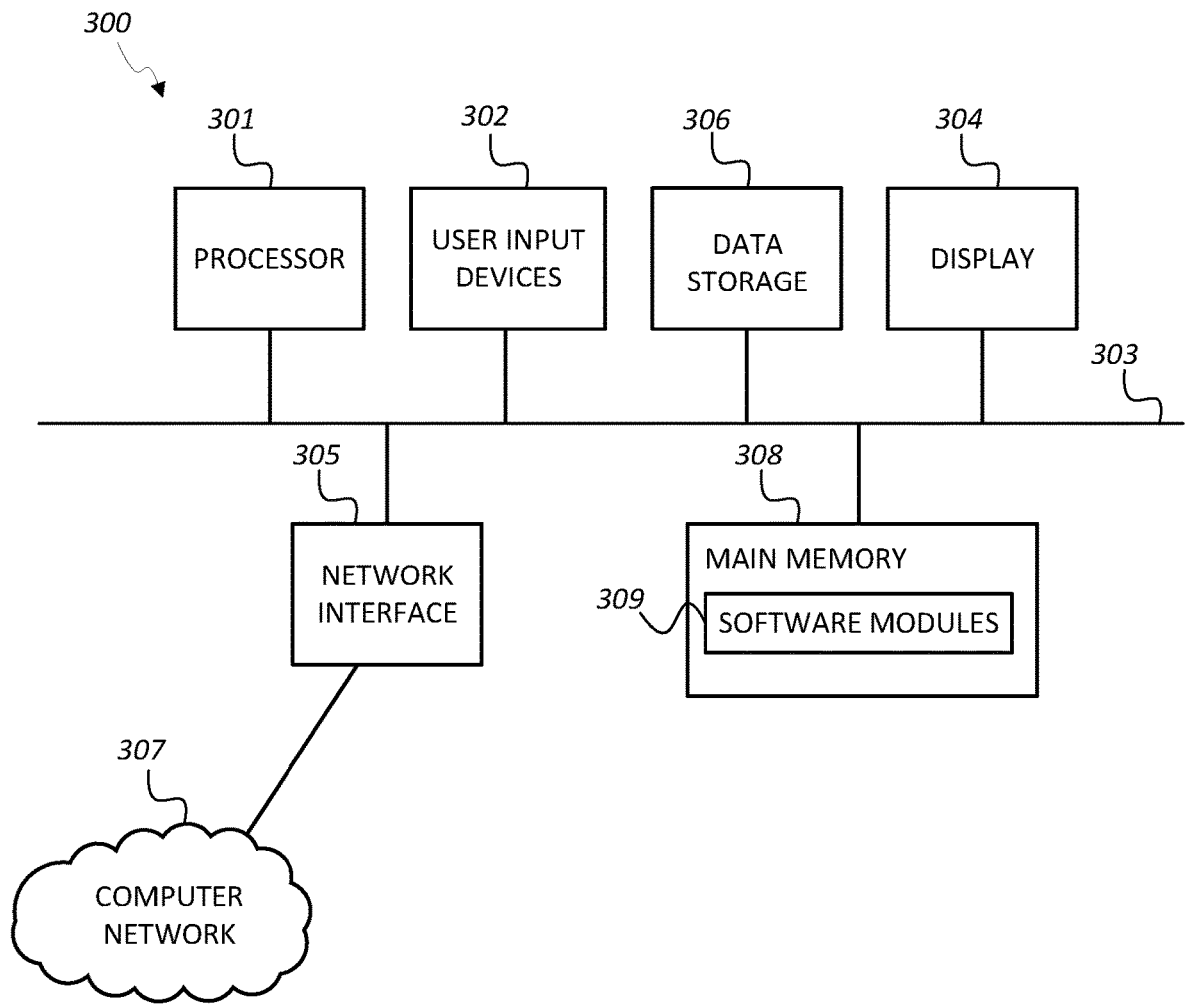
FIG. 3 shows a block diagram of a computer system that may be employed with embodiments of the present invention.

FIG. 3 shows a block diagram of a computer system 300 that may be employed with embodiments of the present invention. The computer system 300 may be employed as a computer system that hosts a URL analyzer or other computer described herein. The computer system 300 may have fewer or more components to meet the needs of a particular cybersecurity application. The computer system 300 may include one or more processors 301. The computer system 300 may have one or more buses 303 coupling its various components. The computer system 300 may include one or more user input devices 302 (e.g., keyboard, mouse), one or more data storage devices 306 (e.g., hard drive, optical disk, solid state drive), a display screen 304 (e.g., liquid crystal display, flat panel monitor), a computer network interface 305 (e.g., network adapter, modem), and a main memory 308 (e.g., random access memory). The computer network interface 305 may be coupled to a computer network 307, which in this example includes the public Internet.

The computer system 300 is a particular machine as programmed with one or more software modules 309, comprising instructions stored non-transitory in the main memory 308 for execution by at least one processor 301 to cause the computer system 300 to perform corresponding programmed steps. An article of manufacture may be embodied as computer-readable storage medium including instructions that when executed by at least one processor 301 cause the computer system 300 to be operable to perform the functions of the one or more software modules 309.

In one embodiment, the software modules 309 comprise instructions of a URL analyzer for detecting suspicious URLs.

While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of detecting a suspicious Uniform Resource Locator (URL) of a resource on the Internet, the method comprising:
   receiving the URL;
   searching a part of the URL for substrings that conform to a Base64 encoding scheme;
   identifying a candidate substring that is longest among the substrings that conform to the Base64 encoding scheme in the part of the URL;
   converting the candidate substring to a candidate binary data in accordance with the Base64 encoding scheme;
   converting the candidate binary data to a candidate American Standard Code for Information Interchange (ASCII) string;
   determining an information type of the candidate ASCII string; and
   determining if the URL is suspicious based on the information type of the candidate ASCII string.

2. The method of claim 1, further comprising:
   detecting that the URL is suspicious in response to the information type of the candidate ASCII string indicating that the candidate ASCII string represents an email address or a phone number.

3. The method of claim 2, further comprising:
   performing a response action in response to detecting that the URL is suspicious, wherein the response action includes raising an alert.

4. The method of claim 1, wherein determining the information type of the candidate ASCII string comprises:
   matching the candidate ASCII string against a regular expression.

5. The method of claim 1, wherein the URL is received in an endpoint computer by a web browser running on the endpoint computer.

6. The method of claim 5, wherein the URL is displayed on an address bar of the web browser.

7. The method of claim 1, wherein the URL is received in an endpoint computer by an email client running on the endpoint computer.

8. The method of claim 1, wherein the URL is from an email.

9. A computer system comprising at least one processor and a memory, the memory storing instructions that when executed by the at least one processor cause the computer system to:
   receive a Uniform Resource Locator (URL) of a resource on the Internet;
   find a candidate substring that is a longest possible substring that conforms to a Base64 encoding scheme in a part of the URL;
   convert the candidate substring to a candidate binary data in accordance with the Base64 encoding scheme;
   convert the candidate binary data to a candidate American Standard Code for Information Interchange (ASCII) string;
   evaluate the candidate ASCII string to determine an information type of the candidate ASCII string; and
   determine if the URL is suspicious based on the information type of the candidate ASCII string.

10. The computer system of claim 9, wherein the computer system is an endpoint computer system, and the URL is displayed on an address bar of a web browser that is running on the endpoint computer.

11. The computer system of claim 9, wherein the computer system is a backend system that received the URL from an endpoint computer that received the URL from an email.

12. The computer system of claim 9, wherein the computer system is a backend system that received the URL from an endpoint computer that received the URL from a web browser.

13. The computer system of claim 9, wherein the computer system is a gateway that received the URL from network traffic passing through the gateway.

14. The computer system of claim 9, wherein the instructions stored in the memory, when executed by the at least one processor, cause the computer system to detect that the URL is suspicious in response to the information type of the candidate ASCII string indicating that the candidate ASCII string represents an email address or a phone number.

15. The computer system of claim 9, wherein the instructions stored in the memory, when executed by the at least one processor, cause the computer system to perform a response action in response to detecting that the URL is suspicious, wherein the response action includes raising an alert.

16. The computer system of claim 9, wherein the instructions stored in the memory, when executed by the at least one processor, cause the computer system to evaluate the candidate ASCII string by matching the candidate ASCII string against a regular expression.

17. A method of detecting a suspicious Uniform Resource Locator (URL) of a resource on the Internet, the method comprising:
   searching a plurality of parts of the URL for substrings that conform to a Base64 encoding scheme;
   identifying a candidate substring in each of the plurality of parts of the URL that has substrings that conform to the Base64 encoding scheme, wherein a candidate substring in a part of the URL is longest among substrings that conform to the Base64 encoding scheme in the part of the URL;
   for each of the plurality of parts of the URL that has a candidate substring, converting the candidate substring to a candidate binary data in accordance with the Base64 encoding scheme, converting the candidate binary data to a candidate American Standard Code for Information Interchange (ASCII) string, and determining an information type of the candidate ASCII string;
   detecting that the URL is suspicious in response to a candidate ASCII string of a part of the URL having an information type that is indicative of a suspicious URL; and
   performing a response action in response to the URL being detected as suspicious.

18. The method of claim 17, wherein the plurality of parts of the URL includes path, query, parameters, and fragment of the URL.

19. The method of claim 17, wherein the response action includes raising an alert.

20. The method of claim 17, wherein the information type is an email address.

* * * * *